US007861537B2

(12) United States Patent
Givens

(10) Patent No.: US 7,861,537 B2
(45) Date of Patent: Jan. 4, 2011

(54) DEVICE AND METHOD OF PROVIDING PORTABLE ELECTRICAL, HYDRAULIC AND AIR PRESSURE UTILITIES FOR ON-SITE TOOL APPLICATIONS

(76) Inventor: Jeffery Givens, 229 Carriage Crossing, Lansing, KS (US) 66043

( * ) Notice: Subject to any disclaimer, the term of this patent is extended or adjusted under 35 U.S.C. 154(b) by 568 days.

(21) Appl. No.: 11/915,866

(22) PCT Filed: Jun. 8, 2006

(86) PCT No.: PCT/US2006/022601

§ 371 (c)(1),
(2), (4) Date: Nov. 29, 2007

(87) PCT Pub. No.: WO2006/133428

PCT Pub. Date: Dec. 14, 2006

(65) Prior Publication Data

US 2010/0089340 A1 Apr. 15, 2010

Related U.S. Application Data

(60) Provisional application No. 60/688,479, filed on Jun. 8, 2005.

(51) Int. Cl.
*F02B 63/00* (2006.01)
*B60L 11/12* (2006.01)

(52) U.S. Cl. ........................................ 60/911; 290/1 A

(58) Field of Classification Search .................. 60/911, 60/916; 290/1 A, 1 R
See application file for complete search history.

(56) References Cited

U.S. PATENT DOCUMENTS 5,809,779 A 9/1998 Bruso
6,181,019 B1 1/2001 Frank
6,979,913 B2 * 12/2005 Storm et al. .................. 290/17

* cited by examiner

*Primary Examiner*—Thomas E Lazo
(74) *Attorney, Agent, or Firm*—Mesmer & Deleault, PLLC

(57) ABSTRACT

Improvements in the device and method of providing portable electrical, hydraulic and compressed air power to a variety of job site applications requiring the use of hand held industrial tools.

20 Claims, 14 Drawing Sheets

DEVICE AND METHOD OF PROVIDING PORTABLE ELECTRICAL, HYDRAULIC AND AIR PRESSURE UTILITIES FOR ON-SITE TOOL APPLICATIONS

BACKGROUND

1. Field of Invention

This invention relates to improvements for providing and using small, self-contained power generating equipment used on industrial job sites for operating an assortment of industrial grade power tools.

2. Description of the Related Art

The desirability of having a small, lightweight and portable power generating system for use on construction and industrial job sites is well known, especially when common electrical power tools are not capable of providing the work required are well known. The obvious advantage is that a single, small, self-contained unit, weighing under 454 kg (1,000 lbs) and about 1.2 m×1.2 m×1.2 m (4'×4'×4') in physical size that can provide a significant amount of hydraulic, electrical and compressed almost simultaneously, with the flip of a single mechanical lever, would currently replace the need for larger, more complex and even multiple units that are now offered in the marketplace to provide the same output. The invention provides extreme flexibility and eliminates the need for more costly and heavier power systems. For example, a small pick up truck could not only easily accommodate the temporary placement or permanent installation of the invention, but would also have enough extra room on board to carry operators and a wide variety of heavy-duty industrial tools required for almost any job. Turning what might be considered a costly project could now be classified as more of a simple task with the use of the invention.

SUMMARY

This invention provides improvements in worksite power equipment control, distribution and output. Reduced environmental impact and equipment costs are vastly improved along with full equipment utilization.

It is the object of the invention to reduce the size of the worksite footprint by combining dissimilar power outputs using a common single engine/frame.

TABLE OF REFERENCES

Figure 1:
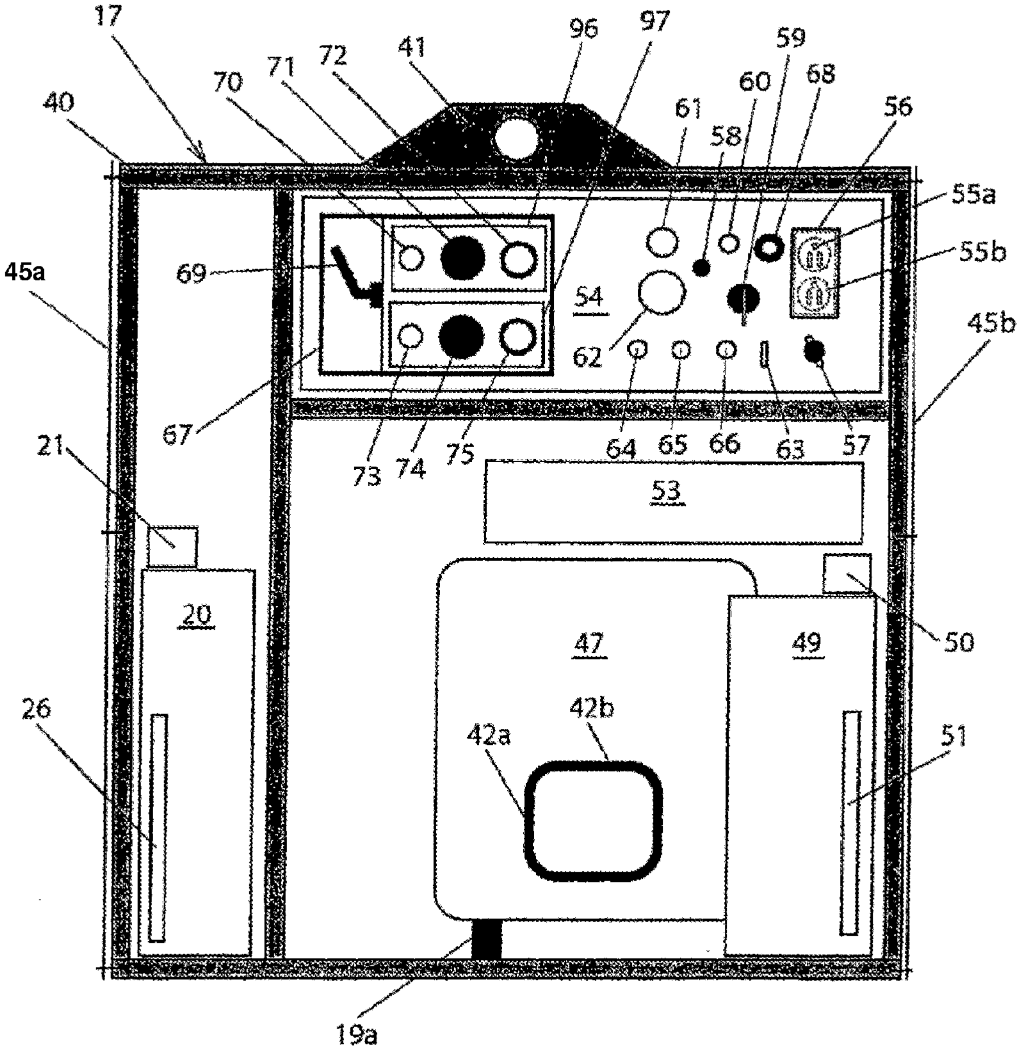
FIG. 1 is a front view of a portable tool power system.

| Ref. No. | Description |
|---|---|
| 17 | portable tool power system |
| 18 | hose |
| 19a | motor mount |
| 19b | motor mount |
| 20 | hydraulic oil reservoir |
| 21 | fill cap, hydraulic oil |
| 22cs | case drain line |
| 22c | junction coupler |
| 22 | return line |
| 23 | filter |
| 24 | pressure gauge |
| 25 | filter vent |
| 26 | oil reservoir sign and temperature gauge |
| 27x | return line |
| 27y | return line |
| 27ap | return port |
| 27p | return port |
| 28 | heat exchanger |
| 29 | hose |
| 30 | cooling fan sensor |
| 31 | engine shutdown sensor |
| 32 | cooling fan |
| 33 | cooling fan housing |
| 34h | hose |
| 34f | pusher fan |
| 34 | radiator |
| 36 | overflow/fill reservoir |
| 37 | battery cable flange |
| 38 | battery connector |
| 39 | battery cable |
| 40 | frame |
| 40x | frame support |
| 40y | frame support |
| 40r | rear support |
| 41 | hoist flange |
| 41a | skid |
| 41b | skid |
| 42a | hydraulic pump |
| 42b | hydraulic pump |
| 43a | fork pocket |
| 43b | fork pocket |
| 44 | lever receiver opening |
| 45a | side cover |
| 45b | side cover |
| 46a | top panel |
| 46b | top panel |
| 47 | engine |
| 48i | air filter intake port |
| 48 | engine air filter |
| 48h | hose |
| 49 | fuel tank |
| 50 | fill cap, fuel |
| 51 | fuel tank sight gauge |
| 52 | fuel filter |
| 52L | fuel line |
| 53 | generator |
| 53m | generator motor |
| 53p | generator port |
| 53h | hose |
| 54 | control panel |
| 55a | 12 A, 110 V power receptacle |

-continued

TABLE OF REFERENCES

| Ref. No. | Description |
|---|---|
| 55b | 12 A, 110 V power receptacle |
| 56 | cover |
| 57 | throttle |
| 58 | preheat light |
| 59 | key start |
| 60 | 12 volt outlet |
| 61 | ammeter gauge |
| 62 | hour meter |
| 63 | manual fan switch |
| 64 | oil temperature light |
| 65 | hydraulic oil temperature light |
| 66 | engine coolant temperature light |
| 67 | hydraulic manifold control unit |
| 68 | 110 V reset button |
| 69m | control valve |
| 69x | four position lever |
| 69 | generator valve lever |
| 69xd | horizontal switch position |
| 69xb | switch position |
| 69xc | switch position |
| 69zb | switch position |
| 69zc | switch position |
| 69z | valve lever |
| 69xa | vertical switch position |
| 69za | vertical switch position |
| 70 | hydraulic pressure port |
| 71 | flow control |
| 72 | return port |
| 73 | pressure port |
| 74 | flow control |
| 75 | return line |
| 76 | flywheel |
| 77 | muffler |
| 78 | insulated wrap |
| 79 | exhaust pipe |
| 81 | hydraulic hose |
| 81p | TC1 pressure port |
| 82 | hydraulic hose |
| 82p | TC2 pressure port |
| 83p | return port |
| 83 | suction hose |
| 84 | suction hose |
| 85 | bypass valve |
| 86 | TC1 pressure relief valve |
| 88 | pressure equalizer |
| 92 | battery |
| 96 | hydraulic tool circuit 1 |
| 97 | hydraulic tool circuit 1 |
| 98 | air compressor |
| 99 | air compressor motor |
| 100 | air compressor heat exchanger |
| 103 | pickup truck |
| 104b | pressure switch |
| 104c | pressure switch |
| 105a | clutch |
| 105b | clutch |
| 106 | coalescing tank |
| 107 | coalescing filter |
| 108 | cooing fan |
| 109 | engine increase idle sensor |
| 110 | mixture control |
| 111 | exhaust line |
| 112 | exhaust line |
| 113 | truck transmission |
| 114 | power take off |
| 115 | shaft coupling |
| 116 | air intake |

DETAILED DESCRIPTION OF DRAWINGS

FIG. 1 is a front view of portable tool power system 17 with control panel 54, engine 47, fuel tank 49, generator 53, hydraulic oil reservoir 20 and hydraulic pumps 42*a* and 42*b* mounted to frame 40. To eliminate extra electrical control devices for measuring fuel, hydraulic oil levels and temperatures, fuel tank 49 is equipped with fuel tank sight gauge 51 and hydraulic oil reservoir 20 is fitted with oil reservoir sight & temperature gauge 26. Fill cap 21 on hydraulic oil reservoir 20 is used for adding more hydraulic oil as well as for allowing a venting means for the hydraulic reservoir 20. Fill cap 21 is breathable. Fill cap 50 may be removed temporarily from fuel tank 49 when adding more fuel, but is generally kept tight to prevent fuel contamination. Engine 47 is mounted to frame 40 via motor mounts 19*a* (and motor mounts 19*b*, 19*c* and 19*d*—not shown) to help isolate and dampen vibration resulting from engine 47 so as to reduce damage to other components of portable tool power system 17 as well as to maintain it in a more stable position during operation. Motor mounts 19*a*, 19*b*, 19*c* and 19*d* may be recessed into frame 40 to reduce the overall height of frame 40. Control panel 54 is shown secured to the top area of frame 40 and is equipped with hydraulic tool circuit #1 96 and hydraulic tool circuit #2 97 for operating hydraulic hand power tools such as a jack hammer, core drill, trash pump, etc. Control panel 54 is also equipped with oil temperature light 64, hydraulic oil temperature light 65, engine coolant temperature light 66, manual fan switch 63, throttle 57, key start 59, hour meter 62, ammeter gauge 61, preheat light 58, 12 volt outlet 60, 110V reset button 68 and two 12 amp, 110V power receptacles 55*a* and 55*b*. Power receptacles 55*a* and 55*b* are kept protected from water and other weather conditions with cover 56 which may be spring loaded. Also shown are hydraulic pumps 42*a* and 42*b* that are mounted to engine 47 in a direct drive configuration. Generator valve lever 69, as part of hydraulic manifold control unit 67, is used to divert hydraulic power to generator 53 to produce 110 v electrical power and/or to provide hydraulic power to tool circuit #1 96 and/or tool circuit #2 97. In the current configuration, hydraulic manifold control unit 67 can only provide power to only two of the three power outlets (tool circuit #1 96, tool circuit #2 97 or 110V receptacles 55*a* and 55*b*.)

Frame 40 is also equipped with hoist flange 41 which may be used for lifting and moving portable tool power system 17. To protect the components of portable tool power system 17 from adverse weather conditions, as well as from wind blown dirt and debris created by driving to and from job sites, side covers 45*a* and 45*b* may be attached to frame 40. Side covers 45*a* and 45*b* may be equipped with doors to make maintenance work easier to perform as well as louvers to allow air circulation around engine 47. As part of hydraulic manifold control unit 67, tool circuit #1 is equipped with hydraulic pressure port 70, flow control 71 and return port 72. Likewise, tool circuit #2 is equipped with pressure port 73, flow control 74 and return line 75.

Figure 2:
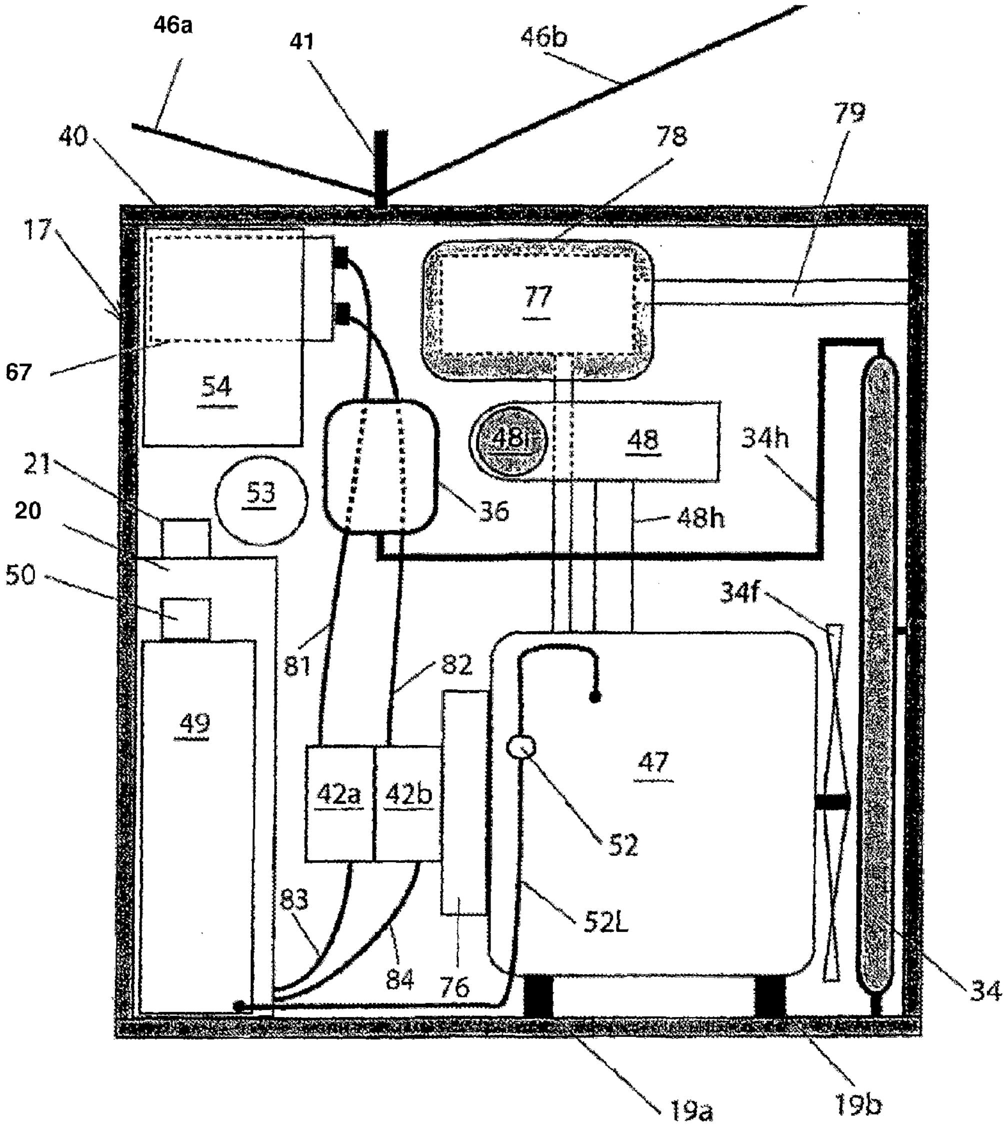
FIG. 2 is a right side view of a portable tool power system showing the location of the engine, hydraulic pumps and oil reservoir.

FIG. 2 is a right side view of portable tool power system 17 showing fuel tank 49 and hydraulic oil reservoir 20 located near the front of frame 40. Mounted behind fuel tank 49 and hydraulic oil reservoir 20 is engine 47, secured to frame 40 via motor mounts 19*a* and 19*b* (19*c* and 19*d* not shown). Fuel line 52L that runs from fuel tank 49 to engine 47 is equipped with fuel filter 52. To reduce any unnecessary heat build-up inside frame 40, engine 47 is equipped with pusher fan 34*f* to force air through radiator 34 so that it is exhausted away from engine 47. Notice also that muffler 77 is equipped with insulated wrap 78 and that exhaust pipe 79 also directs hot air out from within frame 40 and away from engine 47 in an effort to keep engine 47 operating as cool and as efficient as possible. As with almost any engine or power system, high operating temperatures are likely to hinder its optimum operating performance and cause possible damage. Notice that even engine air filter intake port 48*i* of engine air filter 48 is located directly against the sidewall so as to take in cool air from the surrounding area outside of fame 40 instead of within the area inside frame 40. Hose 48*h* is used between engine 47 and air filter 48 to provide the optimum intake location as opposed to leaving air filter 48 mounted in close proximity to engine 47. As shown, radiator 34 comes with overflow/fill reservoir 36 and hose 34*h*. To produce hydraulic power from engine 47, it is equipped with flywheel 76 which is coupled directly to hydraulic pumps 42*a* and 42*b*. Hydraulic pumps 42*a* and 42*b* are connected to hydraulic manifold control unit 67 of control panel 54 via hoses 81 and 82 respectively, to allow hydraulic power to tool circuit #1 96, tool circuit #2 and/or generator 53. Also as shown, frame 40 is equipped with hinged top panels 46*a* and 46*b* to allow easy access for maintenance and other functions. Top panels 46*a* and 46*b* could also be made to slide. Also shown are suction hoses 83 and 84 that allow hydraulic fluid from reservoir 20 to move through pump sections 42*a* and 42*b* respectively.

Figure 3:
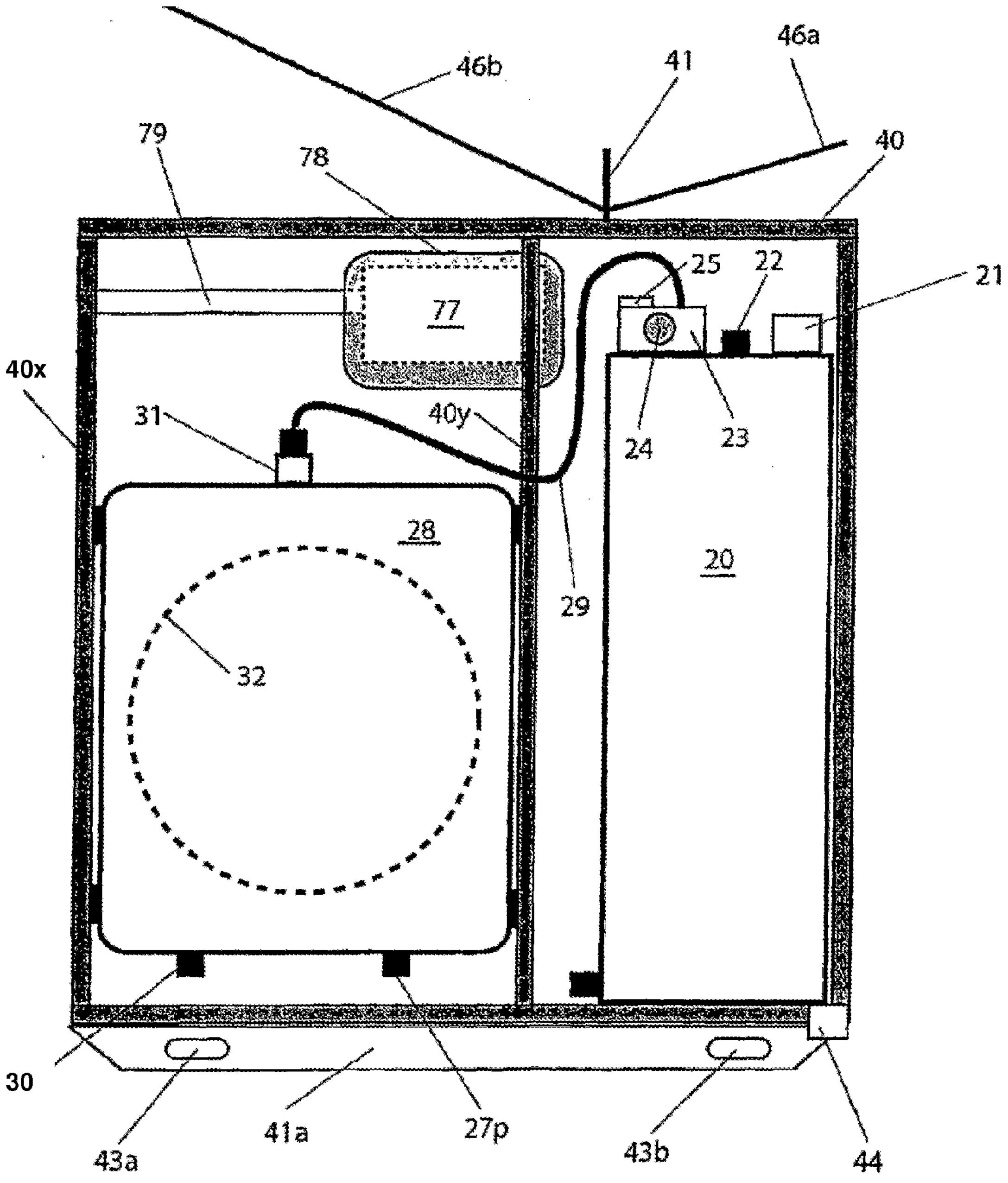
FIG. 3 is a left side view of a portable tool power system showing the position of the heat exchanger, muffler and fuel tank.

FIG. 3 is a left side view of portable tool power system 17 with heat exchanger 28 mounted to frame supports 40*x* and 40*y*. To provide reliable and long-term operation of portable tool power system 17, it is important that the hydraulic fluid used is kept at required operating temperatures. To ensure that the hydraulic fluid is kept in its normal operating temperature range, it must first go through heat exchanger 28 before it can be returned to hydraulic oil reservoir 20 for reuse. As a result of this temperature requirement, hydraulic oil is returned through a return line through return port 27*p* on the bottom of heat exchanger 28. Also located on the bottom of heat-exchanger 28 is cooling fan sensor 30 which monitors the temperature of the returning hydraulic fluid and can either stop or start cooling fan 32 to pull outside air through heat exchanger 28 to reduce its temperature. As hydraulic fluid is pushed upward through heat exchanger 28, it exits through engine shut down sensor 31 and travels back to oil reservoir 20 through hose 29. If engine shut down sensor 31 determines that hydraulic fluid is above the required operating temperature range (typically about 98 C or 208 F) engine 47 will be shut down. Assuming that heat exchanger 28 has reduced the temperature of hydraulic oil sufficiently, hydraulic oil will travel through hose 29 and first enter filter 23 and then drop into oil reservoir 20. Filter 23 is equipped with filter vent 25 and pressure gauge 24. When pressure gauge 24 indicates a high back pressure reading, filter 23 is ready for cleaning. In addition to the majority of hydraulic oil that is typically used for tool circuit #1 96 and tool circuit #2 and must be run through heat exchanger 28, oil used for generator 53 (not shown) must also be returned directly to heat exchanger 28 before returning to hydraulic oil reservoir 20. The only exception in returning all hydraulic oil to heat exchanger 28 is the oil in generator motor 53*m* that may leak through its' seals (typically a few drops per hour of operation) which is returned through case drain line 22*cs*. Frame 40 may also be equipped with skids 41*a* and 41*b* (not shown) to make the pulling, pushing or dragging of portable tool power system 17 easier. Skids 41*a* and 41*b* (not shown) of frame 40 may also be equipped with fork pockets 43*a* and 43*b* and/or lever receiver opening 44. Also shown, to reduce any heat build up within frame 40, muffler 77, with muffler wrap 78, and exhaust pipe 79 direct hot exhaust gases out and away from inside fame 40. In addition to making maintenance easier to perform, top panels 46*a* and 46*b* may be opened to provide added cooling from the atmosphere to engine 47 and hydraulic oil reservoir 20.

Figure 4:
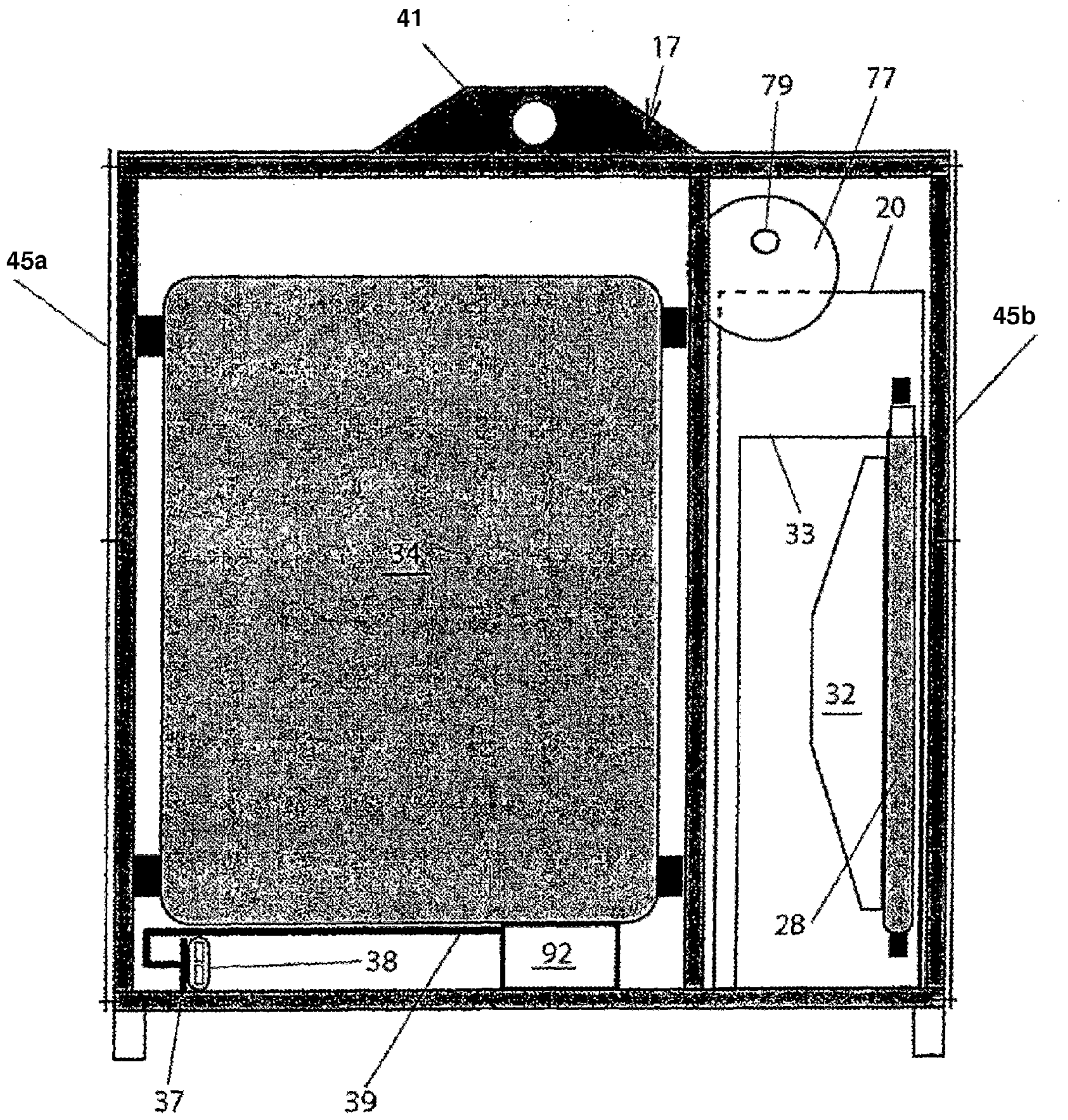
FIG. 4 is an end view of portable tool power system showing the location of the engine radiator and heat exchanger fan and cooling housing.

FIG. 4 is an end view of frame 40 which further demonstrates the positioning and configurations of heat exchanger 28, radiator 34 and muffler 77 to reduce any unnecessary heat build-up within area of frame 40 and to exhaust all hot gas emissions out the back of portable tool power unit 17. In particular, heat exchanger 28 is equipped with cooling fan 32 that pulls outside air through it and then exhausts this, now much warmer air, into cooling fan housing 33. By design, cooling fan housing 33 is open ended at the rear of the portable tool power system as shown to allow this warmer air to exit back to atmosphere. Also shown mounted to frame 40 is battery cable flange 37 that secures battery connector 38 securely in place for operator use. Battery connector 38 is connected to battery 92 via battery cable 39. Battery cable connector may be used for charging battery 92 or for drawing power from battery 92 to operate another electrical device or tool.

Figure 5:
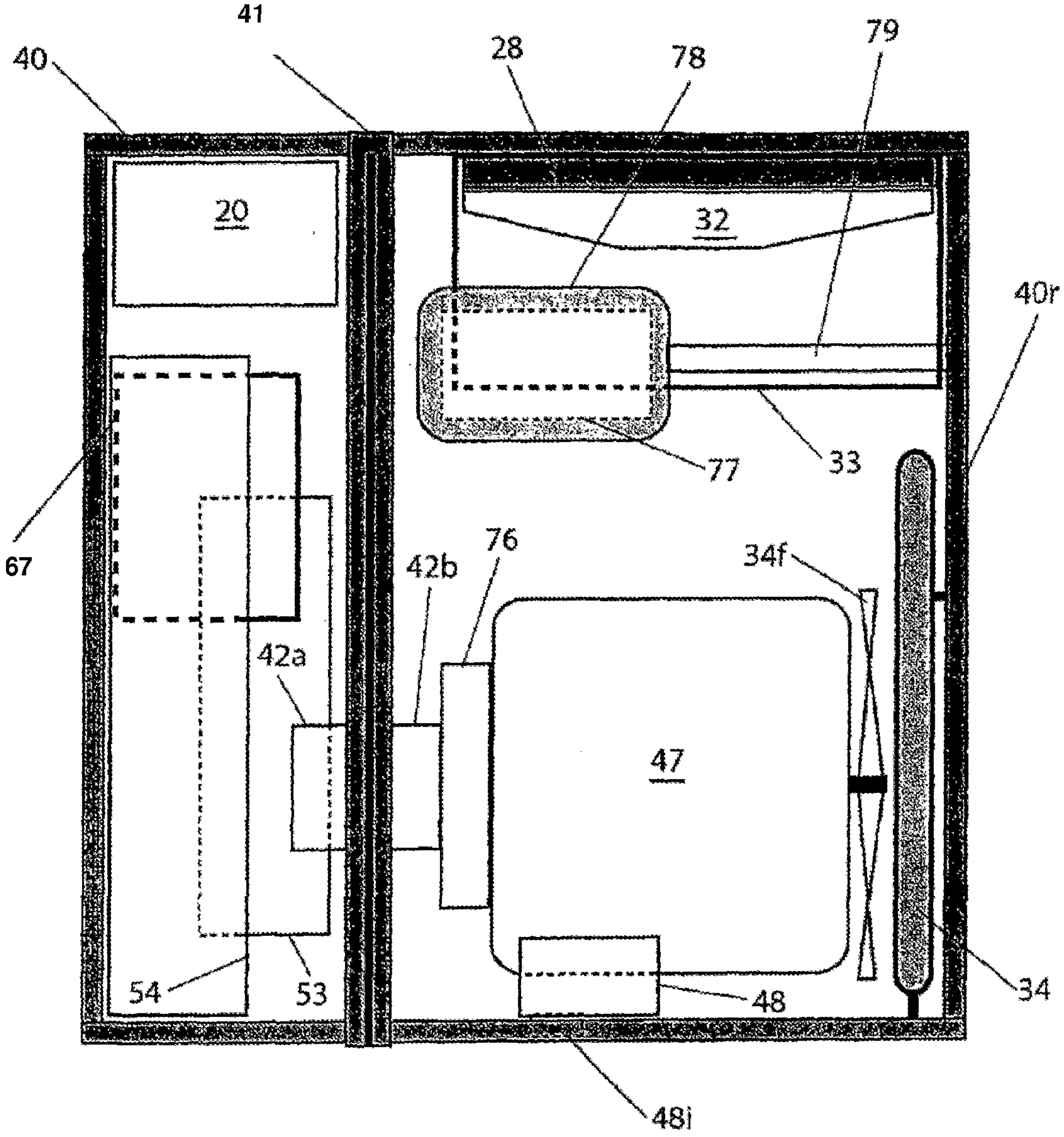
FIG. 5 is a top view of a portable tool power system with the top covers removed.

FIG. 5 is a top view of portable tool power system 17. In the top front area of frame 40 are located control panel 54 with hydraulic manifold control unit 67. Hydraulic pumps 42*a* and 42*b* are shown installed directly with engine 47 via flywheel 76. Again, to improve cooling of engine 47, engine radiator fan 34*f* is a pusher type that pushes air through radiator 34 to atmosphere at the rear support 40*r* of frame 40. Also shown is muffler 77, with insulated wrap 78, and exhaust pipe 79 extending towards frame support 40*r*. Located in the back left corner is heat exchanger 28 that provides the cooling function to maintain the hydraulic oil in the required operating temperature range. Again, to ensure that an unnecessary heat build-up does not occur around engine 47 and hydraulic oil reservoir 20, heat exchanger 28 is equipped with cooling fan 32 that draws cool air from the atmosphere through it and then that cool air that is now much warmer is contained in cooling fan housing 33 and it's only means of exhaust is through the rear end of frame 40 near frame support 40*r*. Intake port 48*i* of engine air filter 48 is also shown as located at the side of frame 40 to provide cool air as opposed to the warmer air that may be present at the rear frame support 40*r*.

Figure 6:
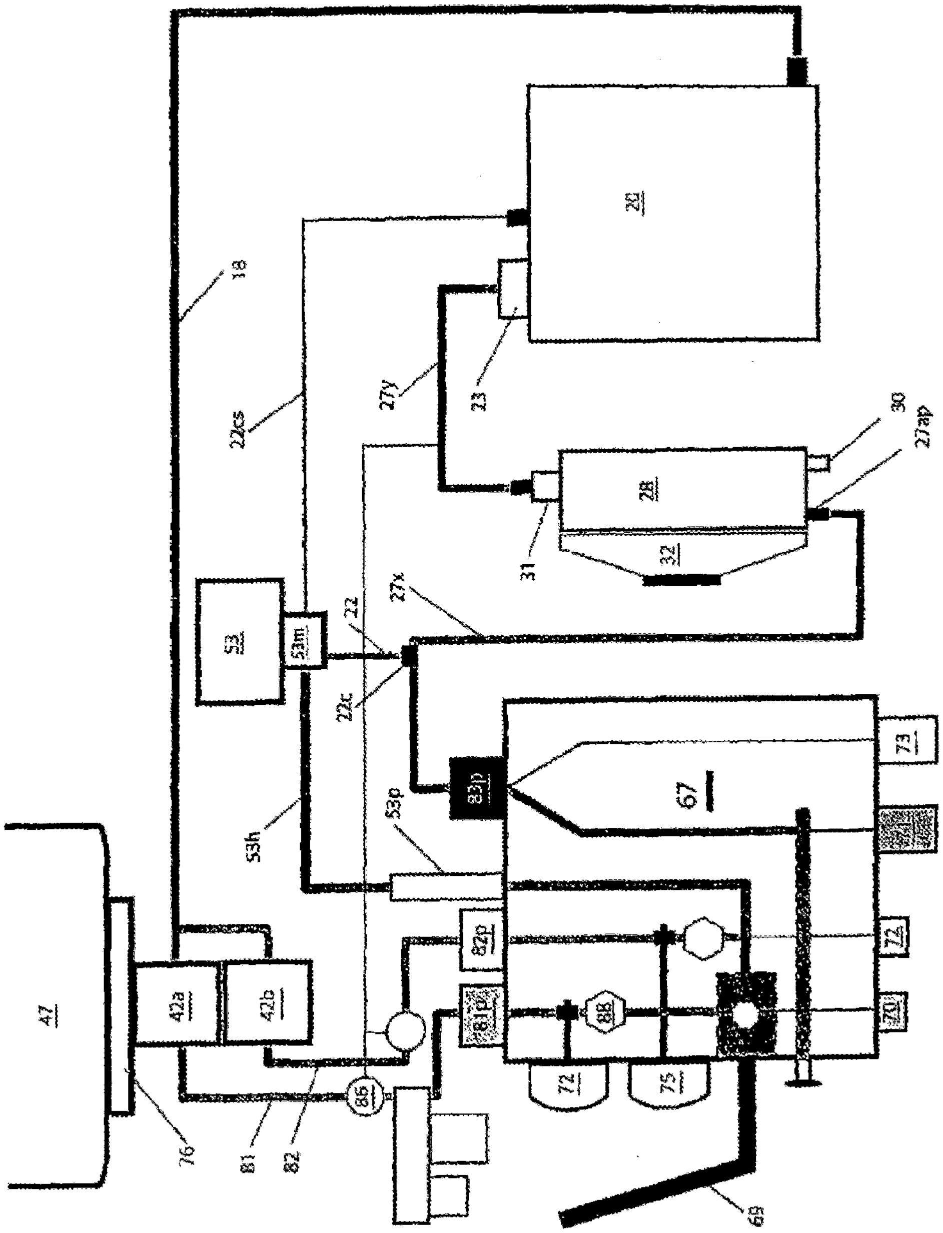
FIG. 6 is a schematic type view of the hydraulic system that controls the various power output devices.

FIG. 6 is a schematic type view of how the components of portable tool power system 17 operate and function together. To start engine 47 properly, generator valve lever 69 is placed in the up position, which closes tool circuit #1 and allows the hydraulic fluid to flow to generator 53 via hose 53*h* and placing tool circuit #2 in the closed position, engine 47 may be started so that hydraulic pumps 42*a* and 42*b* begin pumping under little or no load. While generator 53 will create some resistance to hydraulic pump 42*a*, hydraulic manifold control unit 67 and hose 53*h*, it will be minimal. As shown in this hydraulic manifold control system 67 configuration, hydraulic fluid travels from oil reservoir 20 through hose 18 (which is typically 2.5 cm or 1" diameter in size) to hydraulic pump 42*a* and then through hose 81 and TC 1 pressure relief valve 86 and enters hydraulic manifold control unit at TC 1 pressure port 81*p*. Once entering hydraulic manifold control unit 67, fluid passes through TC 1 pressure equalizer 88 and exits through generator port 53*p* to hose 53*h* to generator motor 53*m*. From generator motor 53*m*, oil returns via return line 22 to junction coupler 22*c* and returns through return line 27*x* to heat exchanger 28 before arriving in oil reservoir 20. In a similar manner, oil also travels through suction hose 18 to hydraulic pump 42*b*. In this case, oil from hydraulic pump 42*b* runs through TC 2 pressure relief valve on its way to and enters hydraulic manifold control unit 67 at port 82*p*. With generator lever 69 in the open position, oil is blocked from entering tool circuit #2 96 and exits hydraulic manifold control 54 unit via return port 83*p* and continues through hose 27*x* until it enters the bottom of heat exchanger 28 through return port 27*ap*. Depending on the temperature of the oil at this point, cooling fan sensor switch 30 may turn on or turn off cooling fan 32. As the oil exits heat exchanger 28, engine shut down sensor 31 monitors and checks the oil temperature again and if it is above the prescribed temperature level (typically over 98 C or 208° F.), engine 47 will shut off. If the oil temperature is in a safe operating range it will continue through return line 27*y* and enter oil reservoir 20 through filter 23. Engine 47 should always be started and shut down with generator valve lever 69 in the up position and tool circuit #2 in the closed position so that no significant load is placed on hydraulic pumps 42*a* and 42*b* when they begin and are required to immediately start producing hydraulic oil pressures in the range of 138 bar to 152 bar (2000 to 2200 PSI).

Figure 7:
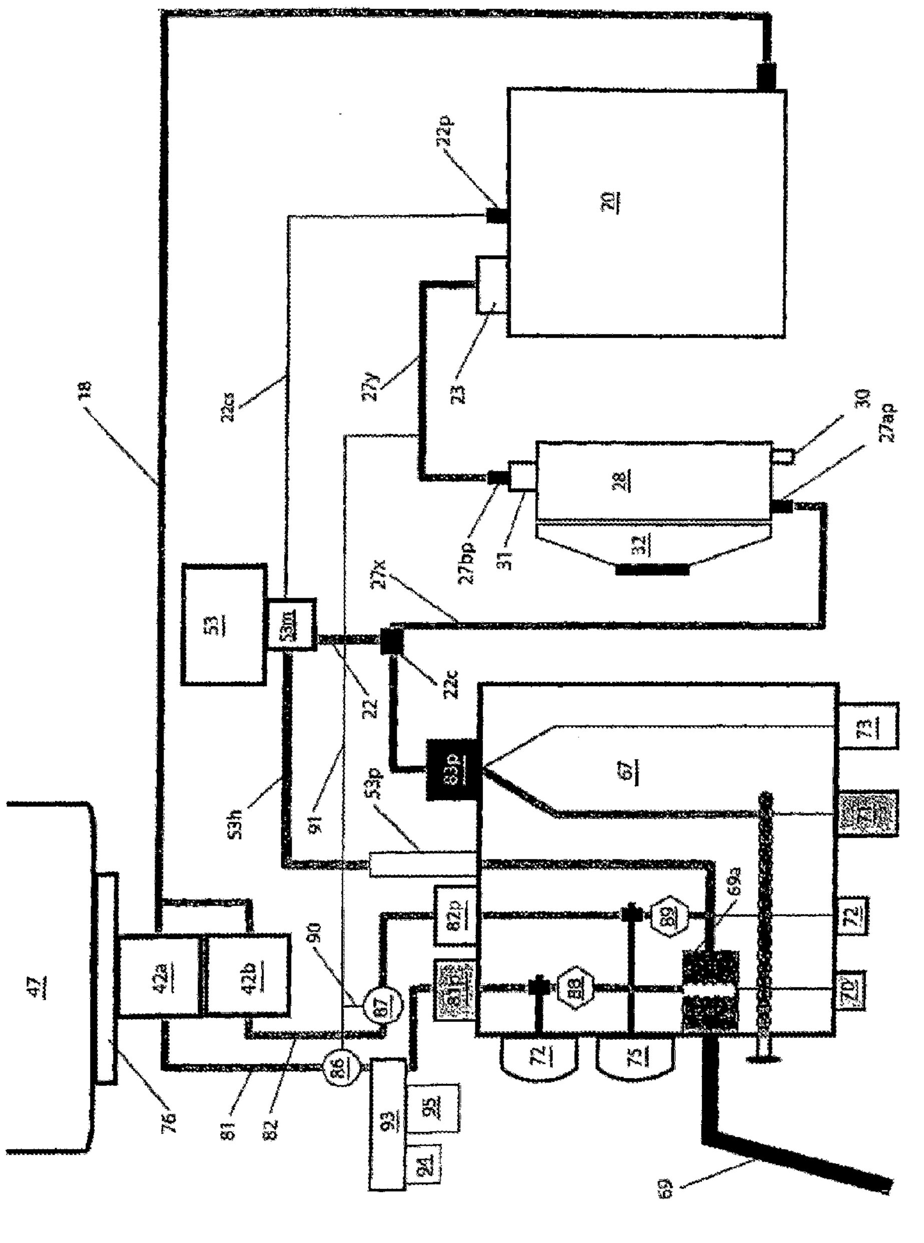
FIG. 7 is a schematic type view of the hydraulic system with one tool circuit and the generator enabled.

FIG. 7 is a schematic type view of portable tool power system 17 showing valve lever 69 in the down position. With valve lever 69 in the down position, hydraulic oil is free to flow to Tool Circuit #1 96 through tool circuit #1 pressure port 70 and return from a power tool in use, such as a saw or jack hammer, through tool circuit #1 return line port 71. As shown, bypass valve remains in the open position to allow hydraulic oil to return to heat exchanger 28.

Figure 8:
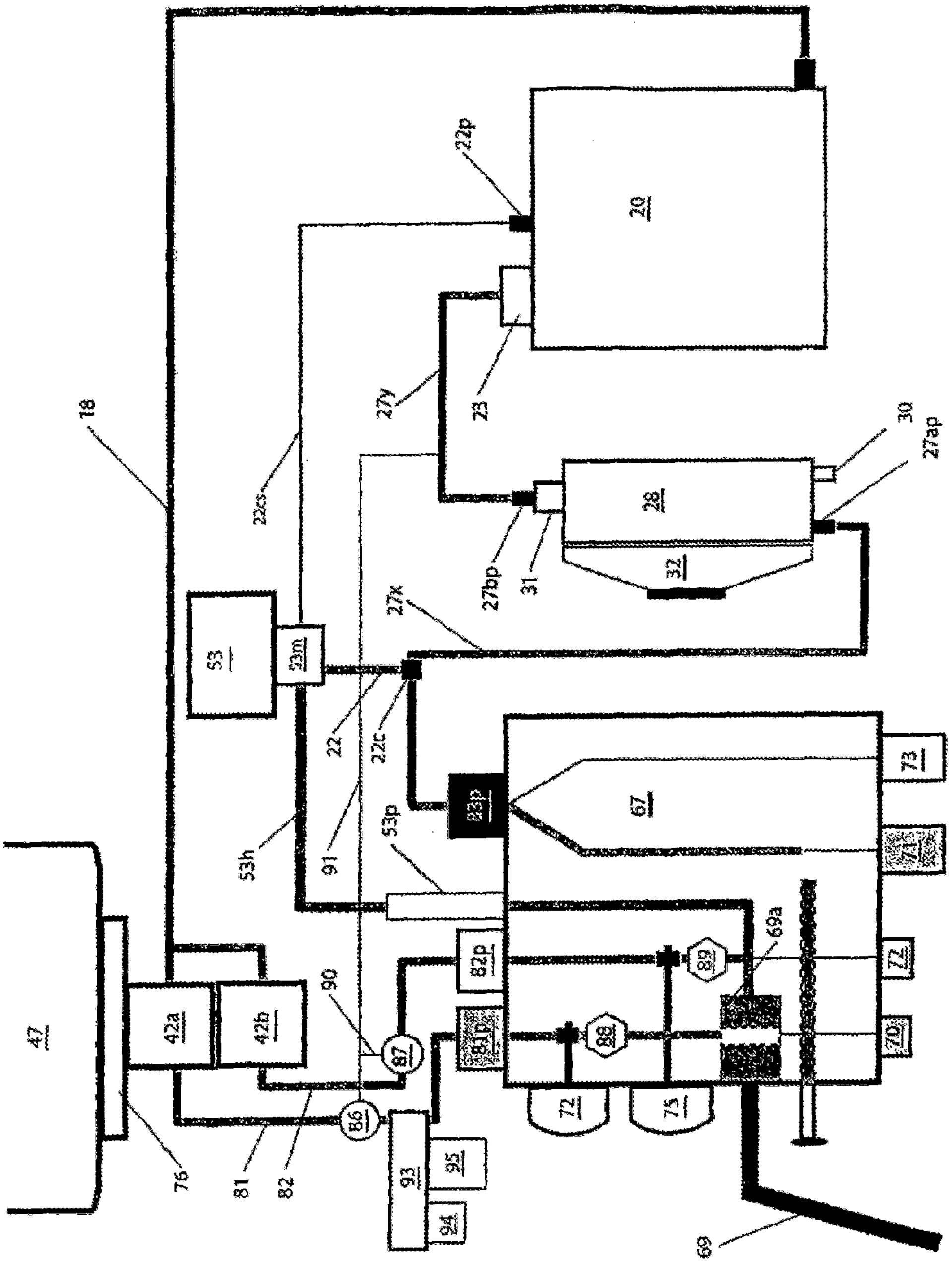
FIG. 8 is a schematic type view of the hydraulic system with both tool circuits enabled.

FIG. 8 is a schematic type view of portable tool power system 17 with its valve lever 69 in the down position and bypass valve 85 in a closed or out position configured to allow both tool circuit #1 and tool circuit #2 for operation. In this configuration, generator 53 will not produce any useable 110V electrical power.

Figure 9:
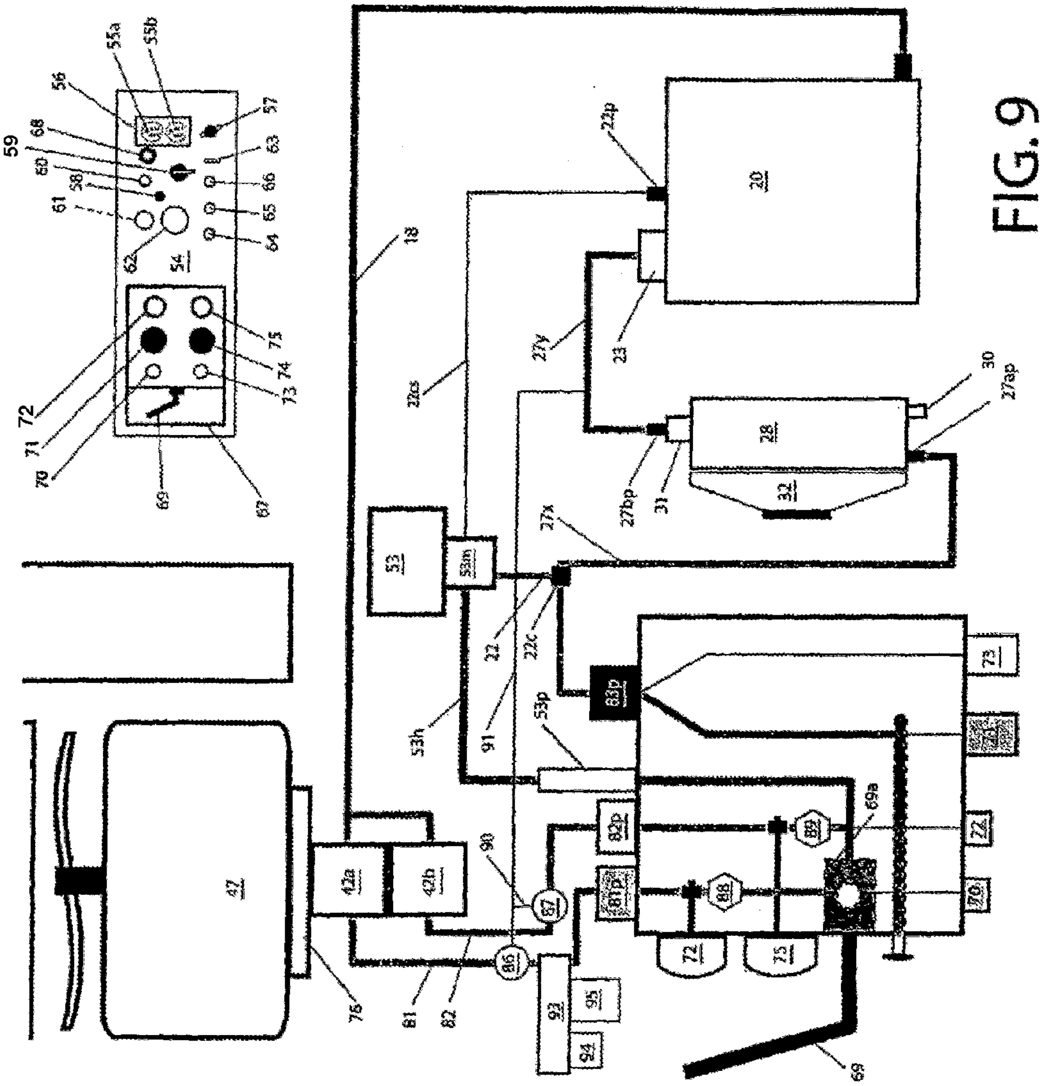
FIG. 9 is a schematic view of the hydraulic system and control panel during start-up and shut down.

FIG. 9 is a schematic type view of portable tool power system 17 and a front view of control panel 54. As shown, with valve lever 69 in the up position and bypass valve 85 in the in or open position, engine 47 can be easily started under a "no load" condition which is preferred and typically required as well as being in a no load configuration for shut down.

Figure 10:
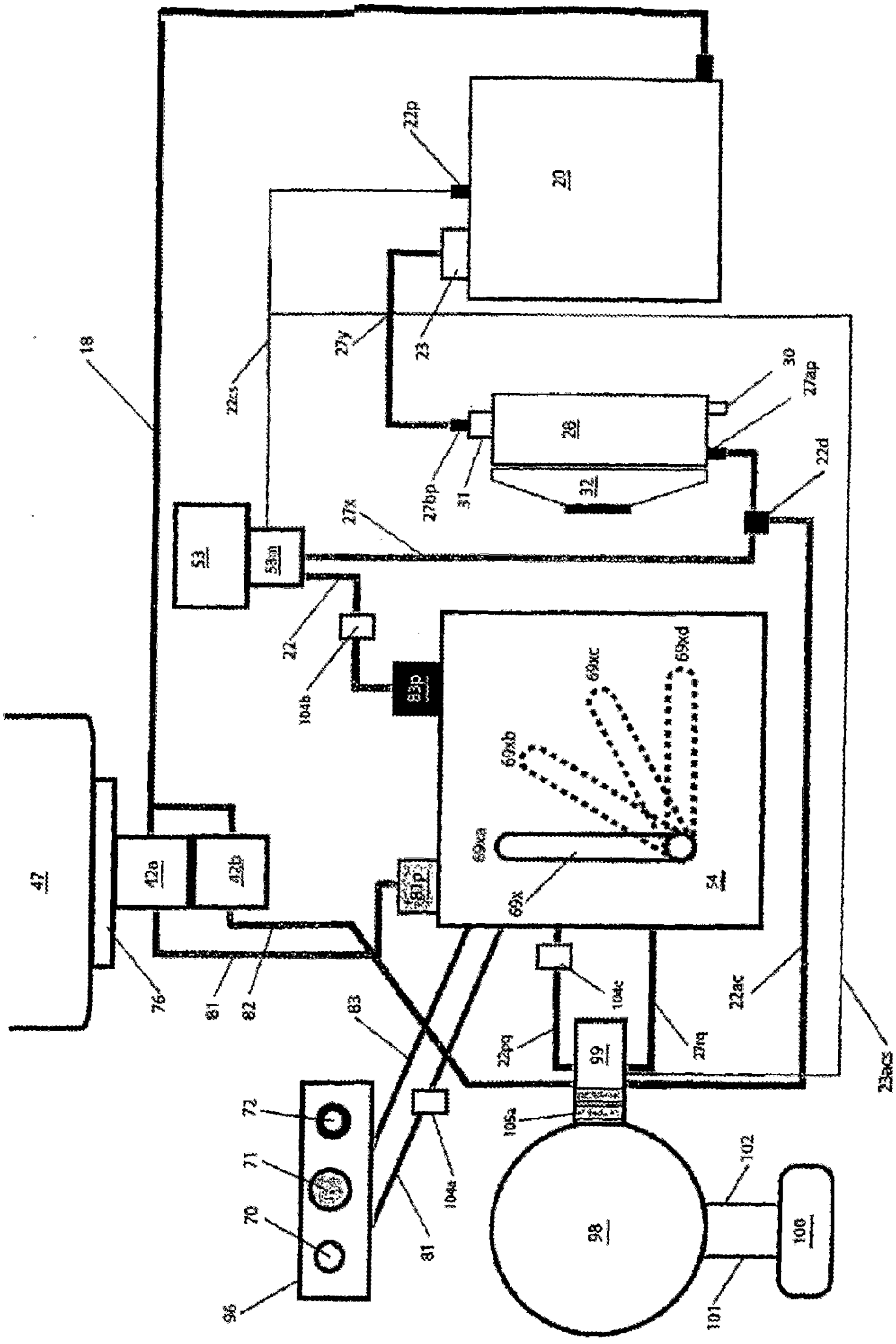
FIG. 10 is a schematic type view of the hydraulic system used with a 4K generator, tool circuit and air compressor.

FIG. 10 is a schematic type view of portable tool power system 17 having tool circuit 96, 4 KW generator 53 and high output air compressor 98 as its main power generating components. In this configuration, control panel 54 is merely a simple manifold with a four position lever 69*x* that can direct the hydraulic fluid to and from the various power units. When lever 69*x* is in the vertical position or in location 69*xa* (which is basically neutral) engine 47 can be started under a no-load condition. The hydraulic fluid that has been pressurized by pumps 42*a* and 42*b* are simply returned back to heat exchanger 28 without having produced any real work output. When lever 69*x* is placed in position 69*xb* however, tool circuit #1 is energized with a maximum power output of 38 liters/minute (10 GPM) at approximately 152 bar (2200 PSI). Tool Circuit #1 is also equipped with flow control 71 to make available the optimum output of hydraulic power (as specified by the manufacturer) for the industrial hand tool to be used. While tool circuit #1 is in operation, pressure switch 104*b* senses the flow of oil through pressure line 81 and simultaneously energizes clutch 105*a* to engage air compressor 98 to produce approximately 1130 liters/minute (40 CFM) at 7 bar (100 PSI). Return line 83 is used to transfer hydraulic fluid from tool circuit #1. When the operator requires both compressed air output and electrical power output, valve lever 69*x* is placed in position 69*xc*. Hydraulic fluid stops flowing to tool circuit #1 and is now redirected through a line to generator motor 53*m* which powers generator 53 to produce up to 4 Kilowatts of electrical power. Hydraulic oil exits generator motor 53*m* through return line 27*rr* back to control panel 54 (manifold) which now can return to heat exchanger 28 for cooling via return line 27*x*. In this configuration, hydraulic oil flowing to generator motor through a pressure line activates pressure switch 104*b* that engages clutch 105*a* of air compressor 98. If the need for more compressed air output is required, the operator may turn lever 69*x* to position 69*xd* so that both hydraulic pumps 42*a* and 42*b* are supplying hydraulic fluid to air compressor motor 99 and both clutches 105*a*. As hydraulic oil flows through line 105*a* to air compressor motor 99, pressure switch 104*c* energizes clutch 105*a* (via a 12V circuit) that results in the maximum output of compressor 98 at approximately 2270 liters/minute (80 CFM).

Figure 11:
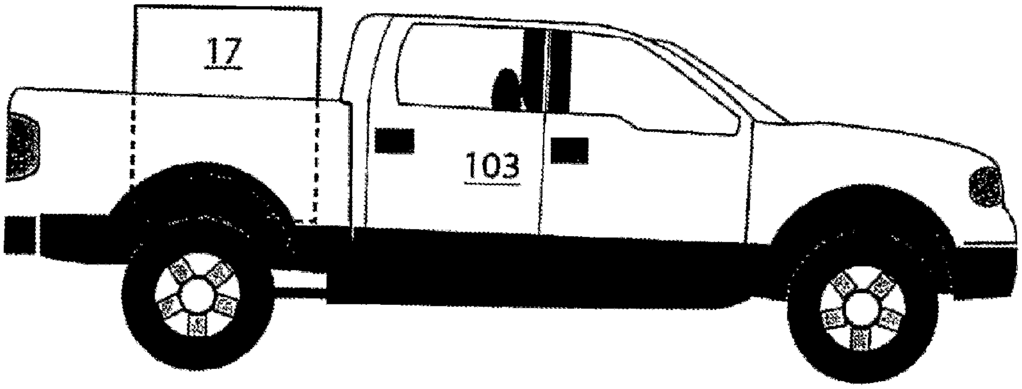
FIG. 11 is a side view of a portable tool power system installed in a pick-up truck.

FIG. 11 is a side view of pick up truck 103 with portable power tool system 17 installed in its bed.

Figure 12:
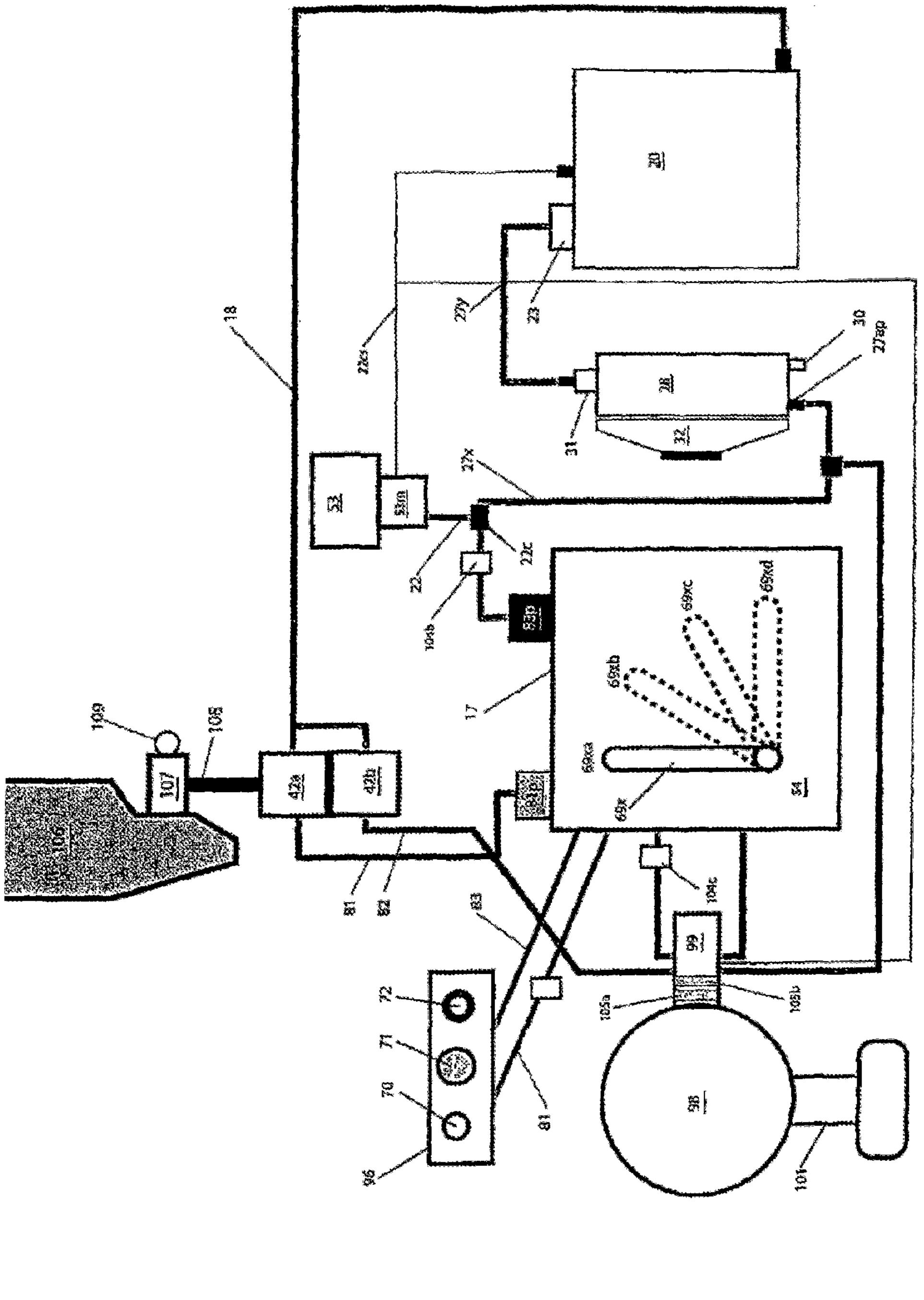
FIG. 12 is a schematic type view of a portable power tool system powered by a truck's engine and power take off unit mounted to the truck's transmission.

FIG. 12 is a schematic type view of portable power tool system 17 powered by power take off 114 mounted to transmission 113 of truck 103 (not shown). Shaft coupling 115 can be used to transfer power from power take off 114 to hydraulic pumps 42*a* and 42*b*. Engine idle increase sensor 109 will increase engine RPM on truck 103 when hydraulic pumps 42*a* and 42*b* are required to generate hydraulic power.

Figure 13:
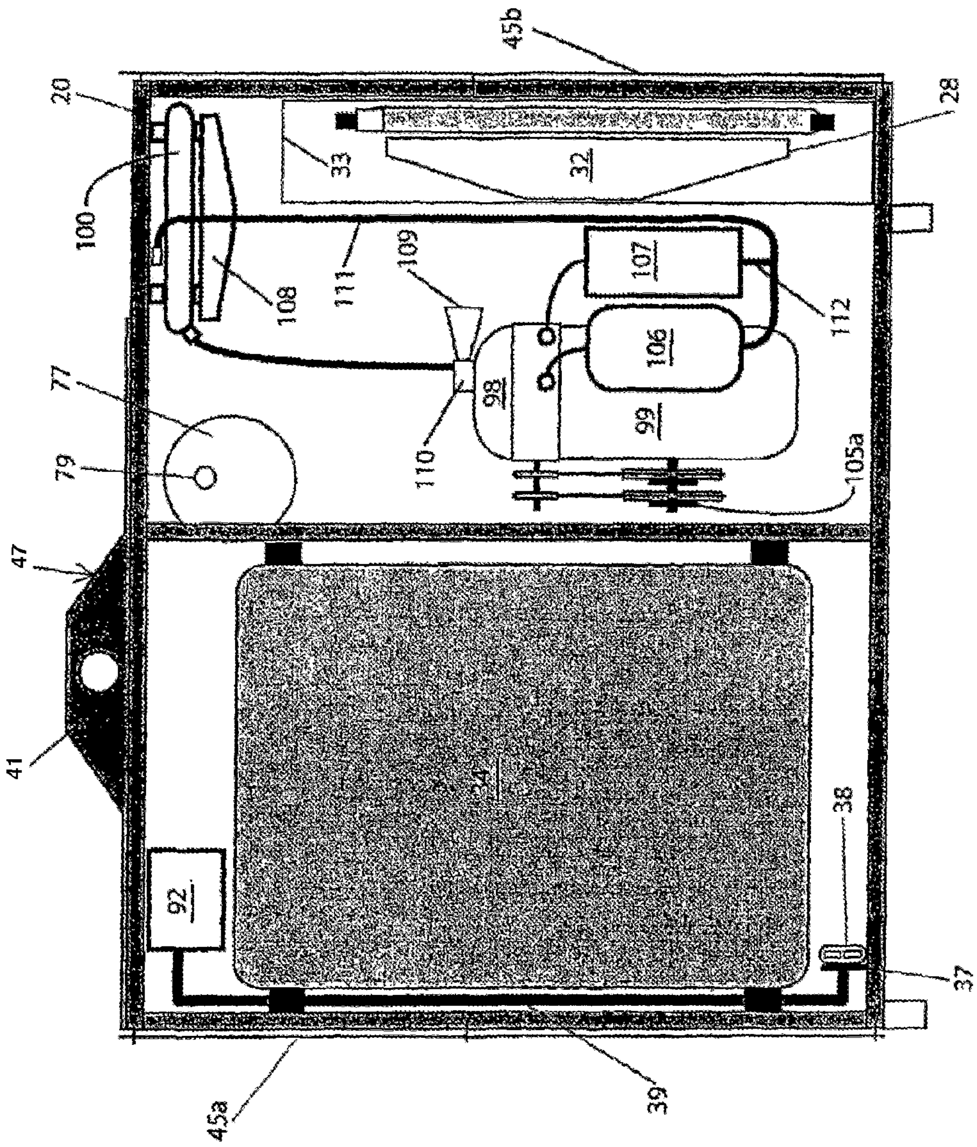
FIG. 13 is an end view of portable power tool system equipped with an air compressor system.

FIG. 13 is an end view of portable power tool system 17 with frame 40 extended outward to provide adequate space for air compressor 98 and air compressor motor 99. Air compressor motor may be bolted directly to frame 40. The air compressor 98 requires the use of its own hydraulic/air compressor fluid, which will become heated during the operation of air compressor 98. The air compressor fluid heat exchanger, cooling fan 108 and temperature override switches (not shown) can be used to keep the compressor fluid within safe and required temperature operating limits. Under normal operation, when air compressor 98 is turned on via activation of electrical clutch 105*a* of air compressor motor 99, mixture control 110 and air intake 116 will provide a mixture of air and air compressor fluid to be compressed via a twin screw mechanism (not shown) in air compressor 98 to provide compressed air at approximately 1130 liters/minute (40 CFM) at 7.6 bar (110 PSI) per clutch unit 105*a*. Clutch unit 105*a* is activated and the resulting compressed air output will be approximately 2270 liters/minute (80 CFM) at 7.6 bar (110 PSI). As the air and compressor fluid is mixed, a bubble mixture is created and drawn through and compressed via air compressor 98, the mixture is separated into compressed air and compressor fluid whereby the majority of the compressor fluid exits into coalescing tank 106 and the remaining fine mist is exhausted into coalescing filter 107. To maintain the compressor fluid within its recommended temperature operating limits of between 66 C (150 F) and 116 C (240 F), air compressor fluid exits coalescing tank 106 via exhaust line 111 while compressed air in coalescing filter 107 exits via exhaust line 112 that connects with exhaust line 111. Air compressor fluid from both coalescing tank 106 and coalescing filter 107 run through exhaust line 111 and enter into air compressor heat exchanger 100. Cooling fan 108 may be activated via switches (not shown) automatically or manually by the operator to help cool air compressor fluid in air compressor heat exchanger 100. Once the air compressor fluid is cooled adequately, it is returned to air compressor 98 via mixture control device 110 for reuse. Mixture control device 110 may also be equipped with other switches, check valves and other components to provide optimum and safe performance of air compressor 98. Should air compressor heat exchanger fail to cool the air compressor fluid to the required operating temperature range, override switches (not shown) will automatically shut engine 47 (not shown) off.

Figure 14:
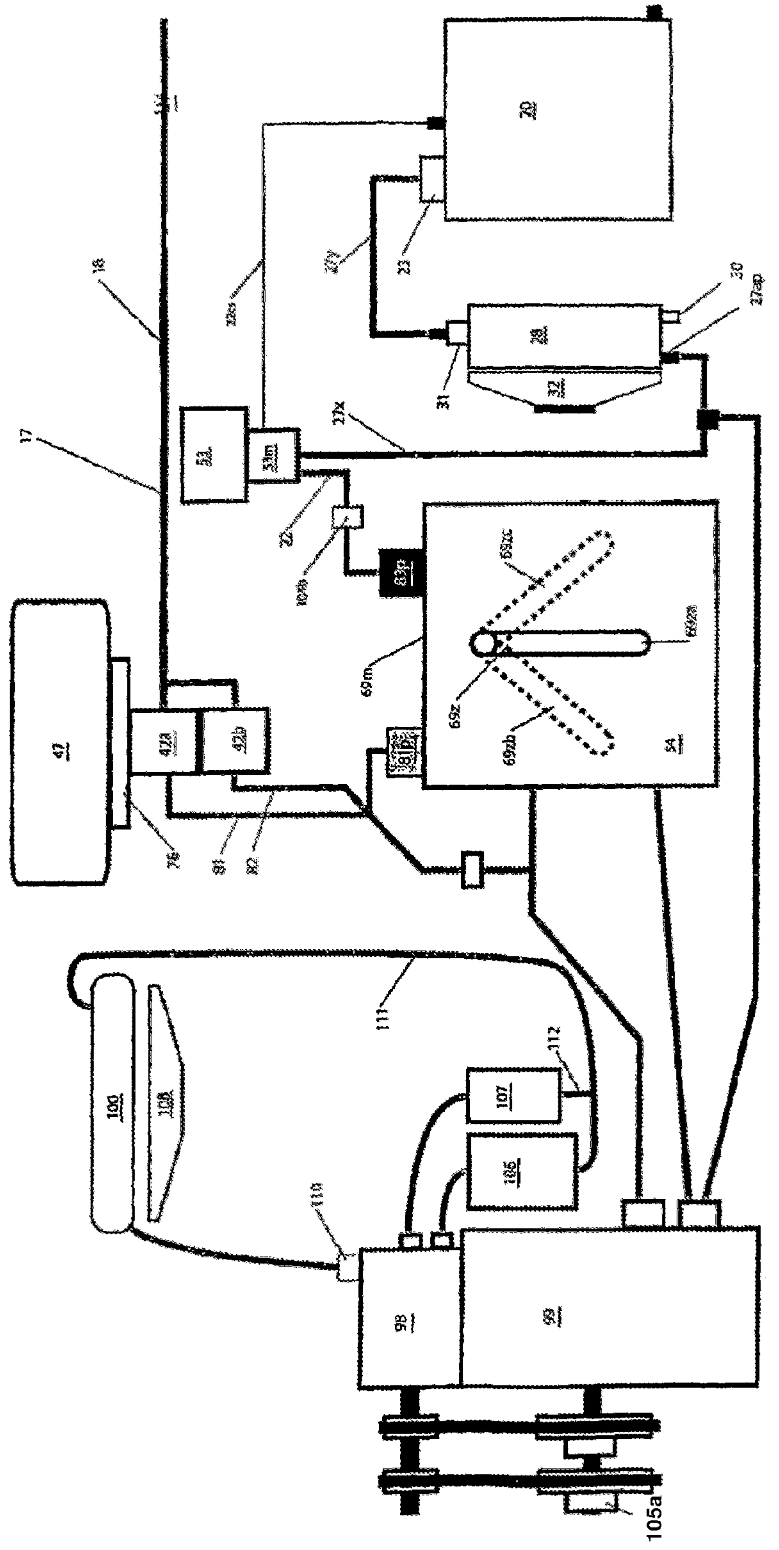
FIG. 14 is a schematic view of the air compressor and cooling system as part of the portable power tool system.

FIG. 14 is a schematic view of portable power tool system 17 showing the main hydraulic system, consisting of engine 47 and hydraulic pumps 42*a* and 42*b* used to provide the power to air compressor motor 99 and the cooling/filtering system required by air compressor 98 to maintain the air compressor fluid in a usable condition. When valve lever 69*z* of control valve 69*m*, located on control panel 54, is in position 69*za,* 76 liters/minute (20 GPM) of hydraulic fluid is directed to air compressor motor with clutches 105*a* and 105*b* disengaged so that air compressor 98 is not producing any compressed air. However, when switch 114 (not shown) is activated by the operator, clutch 105*a* is engaged and air compressor 98 begins producing 2270 liters/minute (80 CFM) at 7.6 bar (110 PSI) of compressed air. When valve lever 69*z* is in position 69*zb* and air compressor switch 114 (not shown) is activated and ON, pumps 42*a* and 42*b* are each supplying 38 liters/minute (10 GPM) of hydraulic fluid to air compressor motor 99 enabling air compressor 98 to produce 1130 liters/minute (40 CFM) of air at 7.6 bar (110 PSI) and 38 liters/minute (10 GPM) of hydraulic fluid to tool circuit #1. In this configuration, when air compressor switch is on, air compressor 98 will produce 40 CFM at 110 PSI of air pressure. If switch 114 is OFF, air compressor 98 will not operate because clutch 105*a* is not engaged. When valve lever 69*z* is in position 69*zc*, the hydraulic fluid from valve manifold 69*m* will be directed to generator 53 to produce 4 KW of electrical power. Also, while in this position, air compressor 98*n* may be turned on with switch 114 to produce 1130 liters/minute (40 CFM) of air at 7.6 bar (110 PSI) or left off so that air compressor is not engaged.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A portable tool power system comprising:

an engine operatively coupled with a hydraulic pump operatively coupled with;

a hydraulically-powered electrical generator;

a control panel having controllers for selectively operating the engine, hydraulic pump, and generator, the control panel also having a hydraulic tool circuit and an electric power output port; and a frame to which the engine, hydraulic pump, control panel, and generator are secured, whereby the system can be ported by its frame to a worksite to selectively supply hydraulic tool circuit and electric power for power tools.

2. The system of claim 1, the hydraulic tool circuit comprising:

a hydraulic pressure port;

a flow controller, and a hydraulic return port.

3. The system of claim 1, the electric power output port comprising at least one of a 12 volt DC power outlet or a 110 volt AC power outlet operatively coupled to the generator.

4. The system of claim 1 further comprising a multi-position flow control valve that diverts hydraulic power from the hydraulic pump to one or a combination of the hydraulic tool circuit and the electric power output port.

5. The system of claim 1 further comprising a hoist flange secured to the frame to facilitate moving the system.

6. The system of claim 1 further comprising a side cover secured to the frame.

7. The system of claim 6, wherein said side cover comprising a door or louver.

8. The system of claim 6 further comprising an air filter operatively coupled with the engine and an air filter intake port operatively coupled with the air filter and through the side cover.

9. The system of claim 1 further comprising a top panel secured to the frame.

10. The system of claim 9, wherein the top cover is hinged to the frame or slideable in relation to the frame.

11. The system of claim 1 further comprising skids secured to a bottom end of the frame.

12. The system of claim 11, the skids comprising at least one of fork pockets and lever receiver openings.

13. The system of claim 1 further comprising a radiator operatively coupled with the engine to maintain the engine at a proper operating temperature.

14. The system of claim 13 further comprising a pusher fan operatively coupled with the radiator.

15. The system of claim 1 further comprising a flywheel operatively disposed between the engine and the hydraulic pump.

16. The system of claim 1 further comprising a hydraulically powered air compressor operatively coupled with the hydraulic pump for powering air powered tools.

17. The system of claim 16 further comprising a hydraulic air compressor motor.

18. The system of claim 16 further comprising a coalescing tank.

19. A portable tool power system comprising:

a power take off attachable to an automobile transmission coupled with a hydraulic pump operatively coupled with;

a hydraulically powered electrical generator;

a control panel having controllers for selectively operating the engine, hydraulic pump, and generator, the control panel also having a hydraulic tool circuit and an electric power output port; and a frame to which the power take off, hydraulic pump, control panel, and generator are secured, whereby the system can be ported by its frame to a worksite to selectively supply hydraulic tool circuit and electric power for power tools.

20. The system of claim 19 further comprising an engine idle increase sensor.

* * * * *